US007739895B2

(12) United States Patent
McMasters et al.

(10) Patent No.: US 7,739,895 B2
(45) Date of Patent: Jun. 22, 2010

(54) VERIFICATION OF SCALE CALIBRATION METHOD AND APPARATUS

(75) Inventors: Mark William McMasters, Owatonna, MN (US); William Clayton Brown, Owatonna, MN (US)

(73) Assignee: SPX Corporation, Charlotte, NC (US)

( * ) Notice: Subject to any disclaimer, the term of this patent is extended or adjusted under 35 U.S.C. 154(b) by 296 days.

(21) Appl. No.: 11/954,724

(22) Filed: Dec. 12, 2007

(65) Prior Publication Data

US 2009/0151420 A1   Jun. 18, 2009

(51) Int. Cl.
*G01G 23/01* (2006.01)
(52) U.S. Cl. ........................................ 73/1.13; 702/101
(58) Field of Classification Search .................. 73/1.13; 702/101
See application file for complete search history.

(56) References Cited

U.S. PATENT DOCUMENTS 5,189,901 A * 3/1993 Draus ......................... 73/1.02
7,480,579 B2 * 1/2009 Lueschow et al. ........... 702/101
2004/0267474 A1 * 12/2004 Drake et al. ................. 702/101

* cited by examiner

*Primary Examiner*—Thomas P Noland
(74) *Attorney, Agent, or Firm*—Baker & Hostetler LLP

(57) ABSTRACT

A method of determining whether a scale in a fluid handling device needs to be calibrated includes weighing a storage tank of fluid a first time with a scale, transferring the fluid from the storage tank to an area of known volume, weighing the storage tank at a second time with the scale, after fluid has been moved to the area of known volume, determining the pressure of the fluid in the area of known volume with a pressure sensor, calculating a temperature of the fluid in the area of known volume with the determined pressure, calculating the weight of fluid in the area of known volume based on the calculated temperature, calculating the weight of fluid in the area of known volume based on the determined temperature and temperature, comparing a difference in weight of the storage tank between the first and second weighing times with the weight of the fluid in the area of known volume; and sending a first signal to a user indicating a calibration of the scale is not needed if the difference between the compared weights of the fluid is within a predetermined range.

25 Claims, 2 Drawing Sheets

VERIFICATION OF SCALE CALIBRATION METHOD AND APPARATUS

FIELD OF THE INVENTION

The present invention relates generally to determining whether or not a scale needs to be calibrated. More particularly, the present invention relates to a method and apparatus for determining whether a scale in a fluid servicing device such as a refrigerant reconditioning system needs to be calibrated.

BACKGROUND OF THE INVENTION

Fluid handling systems such as a vehicle refrigerant reconditioning system have internal scales that are used, among other things, to weigh a storage tank containing refrigerant. One way to test the scale to ensure it is calibrated is to use a weight having a known weight. To determine if a scale is calibrated, a user puts the calibrated weight on the scale and compares the reading of the scale with the known weight. Such calibration techniques may work, however, they do require an extra step of manually weighing the calibrated weight and comparing the readout on the scale with the amount of the known weight.

In addition to providing good operation of a fluid handling system, calibration of an internal scale may also be required by industry standards. For example, SAE J-2788 requires that certain refrigerant handling systems include a means for the user to verify that an internal scale is calibrated.

Accordingly, it is desirable to provide a method and apparatus that in some embodiments of the invention, permits a user to determine whether an internal scale for a refrigerant handling system is calibrated.

SUMMARY OF THE INVENTION

The foregoing needs are met, to a great extent, by the present invention, wherein in one aspect an apparatus is provided that in some embodiments of the invention permits a user to verify whether an internal scale of a refrigerant handling system is calibrated.

In accordance with one embodiment of the present invention, a method of determining whether a scale in a fluid handling device needs to be calibrated is provided, which comprises weighing a storage tank of a fluid at a first time with a scale, transferring the fluid from the storage tank to an area of known volume, weighing the storage tank at a second time with the scale, after fluid has been moved to the area of known volume, determining a pressure of the fluid in the area of known volume with a pressure sensor, calculating a temperature of the fluid in the area of known volume with the determined pressure, calculating the weight of fluid in the area of known volume based on the calculated temperature, comparing a difference in weight of the storage tank between the first and second weighing times with the weight of the fluid in the area of known volume, and sending a first signal to a user indicating a calibration of the scale is not needed if the difference between the compared weights of the fluid is within a predetermined range.

In accordance with another embodiment of the invention, an article comprising a computer-readable medium which stores computer-executable instructions is provided, the instructions which can cause a computer to weigh a storage tank of a fluid at a first time with a scale, transfer the fluid from the storage tank to an area of known volume, weigh the storage tank at a second time with the scale, after fluid has been moved to the area of known volume, determine a pressure of the fluid in the area of known volume with a pressure sensor, calculate a temperature of the fluid in the area of known volume with the determined pressure, calculate the weight of fluid in the area of known volume based on the calculated temperature, compare a difference in weight of the storage tank between the first and second weighing times with the weight of the fluid in the area of known volume, and send a first signal to a user indicating a calibration of the scale is not needed if the difference between the compared weights of the fluid is within a predetermined range.

In accordance with yet another embodiment of the invention, a fluid handling device configured to perform the steps for weighing a storage tank of a fluid at a first time with the scale, step for transferring the fluid from the storage tank to an area of known volume, step for weighing the storage tank at a second time with the scale, after fluid has been moved to the area of known volume, step for determining a pressure of the fluid in the area of known volume with a pressure sensor, step for calculating a temperature of the fluid in the area of known volume with the determined pressure, step for calculating the weight of fluid in the area of known volume based on the calculated temperature, step for comparing a difference in weight of the storage tank between the first and second weighing with the weight of the fluid in the area of known volume, step for sending a first signal to a user indicating a calibration is not needed if the difference between the compared weights of the fluid is within a predetermined range, and step for sending a second signal to a user indicating the calibration is needed if the difference between the compared weights of the fluid is not within a predetermined range.

In accordance with still another embodiment, a method of determining whether a scale in a fluid handling device needs to be calibrated is provided and includes weighing a storage tank of a fluid at a first time with a scale, transferring the fluid from the storage tank to an area of known volume, weighing the storage tank at a second time with the scale, after fluid has been moved to the area of known volume, determining the temperature of the fluid in the area of known volume with a temperature sensor, calculating the weight of fluid in the area of known volume based on the determined temperature, comparing a difference in weight of the storage tank between the first and second weighing times with the weight of the fluid in the area of known volume, and sending a first signal to a user indicating a calibration of the scale is not needed if the difference between the compared weights of the fluid is within a predetermined range.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
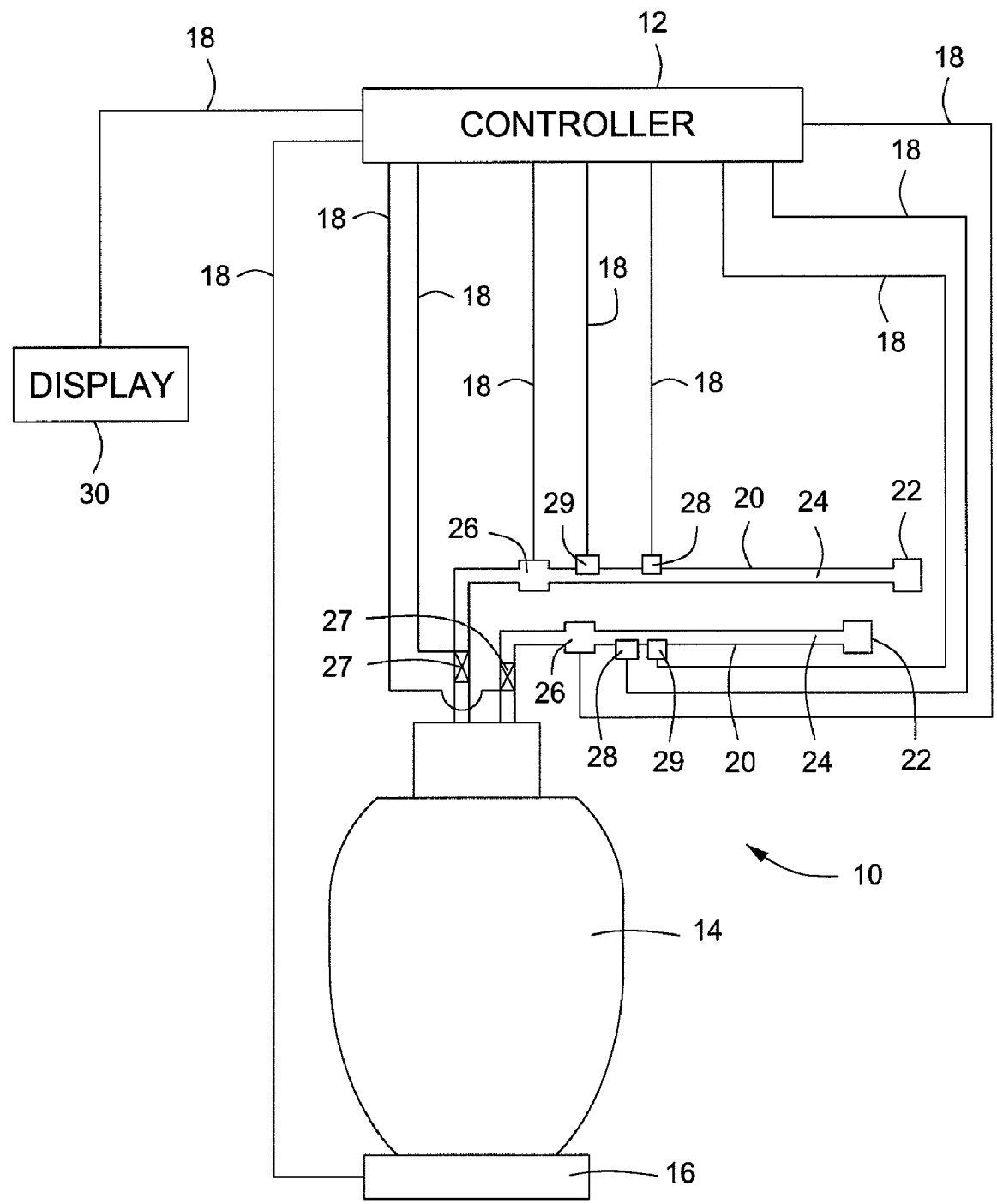
FIG. 1 is a schematic diagram of certain components of a fluid handling system according to one embodiment of the invention.

The invention will now be described with reference to the drawing figures, in which like reference numerals refer to like parts throughout. An embodiment in accordance with the present invention provides a method of programming or reprogramming a controller on a refrigerant handling system to perform calibration on an internal scale within the fluid handling system.

In some embodiments of the invention, an existing material handling system controller can be reprogrammed to test the scale for calibration by using existing components in the fluid handling system. In other embodiments of the invention, fluid handling systems can be modified to add new components as needed in order to perform the calibration diagnostics on an internal scale. In still other embodiments of the invention, new refrigerant fluid handling systems can be prepared having components used for performing the diagnostic function and determining whether an internal scale needs to be calibrated.

Turning now to FIG. 1, a schematic diagram of a refrigerant handling system is illustrated. While the schematic diagram illustrated in FIG. 1 is meant to be a generic fluid handling system, an example of fluid handling system that could be modified to perform in accordance with the invention includes a recovery recycling recharging unit (Cooltech™ model 34788) under the ROBINAIR™ name by SPX Corporation, located at 655 Eisenhower Drive, Owatonna, Minn.

As shown in FIG. 1, the schematic diagram illustrates a refrigerant handling system 10. The system 10 includes a controller 12 and a storage tank 14 used to store fluid such as refrigerant. The controller controls various functions of the refrigerant handling system. The controller 12, in some embodiments of the invention, is a microcontroller that can be programmed and/or reprogrammed with processor readable code that will cause the controller to send signals to various parts of the fluid handling device to perform various tasks. One such task is to calibrate a scale as discussed below.

The storage tank 14 is set upon a scale 16 configured to weigh the storage tank 14 in order to determine how much fluid is in the storage tank 14. In some embodiments of the invention, the weight of the tank 14 is known and the weight of the tank is subtracted from the measured weight to determine how much fluid is in the tank 14. In other embodiments, the tank 14 is weighed at different times when there are different amounts of fluid in the tank 14 and the weights are compared to determine how much fluid is in (or has moved from or to) the tank 14.

The scale 16 is operatively connected to the controller 12 via connectors 18. Hoses 20 provide a fluid path for fluid within the storage tank 14 to an air conditioning (A/C) system of a vehicle (not shown). Valves 22 are located at an end of the hoses 20 and are designed to mate with the A/C system. When the hoses 20 are disconnected from the A/C system valves 22 are closed to prevent fluid from leaving the hoses 20 and discharging into the ambient air.

Pumps 26 are connected to the hoses 20 in order to move fluid through an interior 24 of the hoses 20 and in or out of the storage tank 14. The pumps 26 are connected to and controlled by the controller 12 via connectors 18. The pumps 26 can be controlled by the controller 12 to be on or off and to selectively pump at certain pressures. Panel valves 27 are located along the hoses 20 and are configured to selectively permit fluid communication between the interior 24 of the hoses 20 and the interior of the storage tank 14. In some embodiments of the invention, the panel valves 27 may be operatively connected to the controller 12 via connectors 18.

Pressure sensors 28 are located in the hoses 20 and are configured to sense a fluid pressure within the interior 24 of the hoses 20 and report the sensed pressure to the controller 12 via the connectors 18. Temperature sensors 29 senses the temperature in line 30 and the temperature reading is sent to the controller via the connectors 18 for evaluation (see FIG. 2).

A display 30 is also connected to the controller 12 via connectors 18. The display displays various information related to the operations of the handling system 10 including calibration information and instructions. The display 30 can also indicate a visual message to a user and include a color, a text message, or an icon to indicate whether the scale 16 needs to be calibrated or not.

The connectors 18 may be a wired connection or may be a wireless connection. Connectors 18 of any type of operative connection are within the embodiments of the invention.

In some embodiments of the invention, the user can be notified or communicated to by use of an audio signal to indicate whether or not the scale 16 needs to be calibrated. In other embodiments of the invention, an audio and visual signal generated by the display 30 can indicate to a user whether or not the scale 16 needs to be calibrated.

Figure 2:
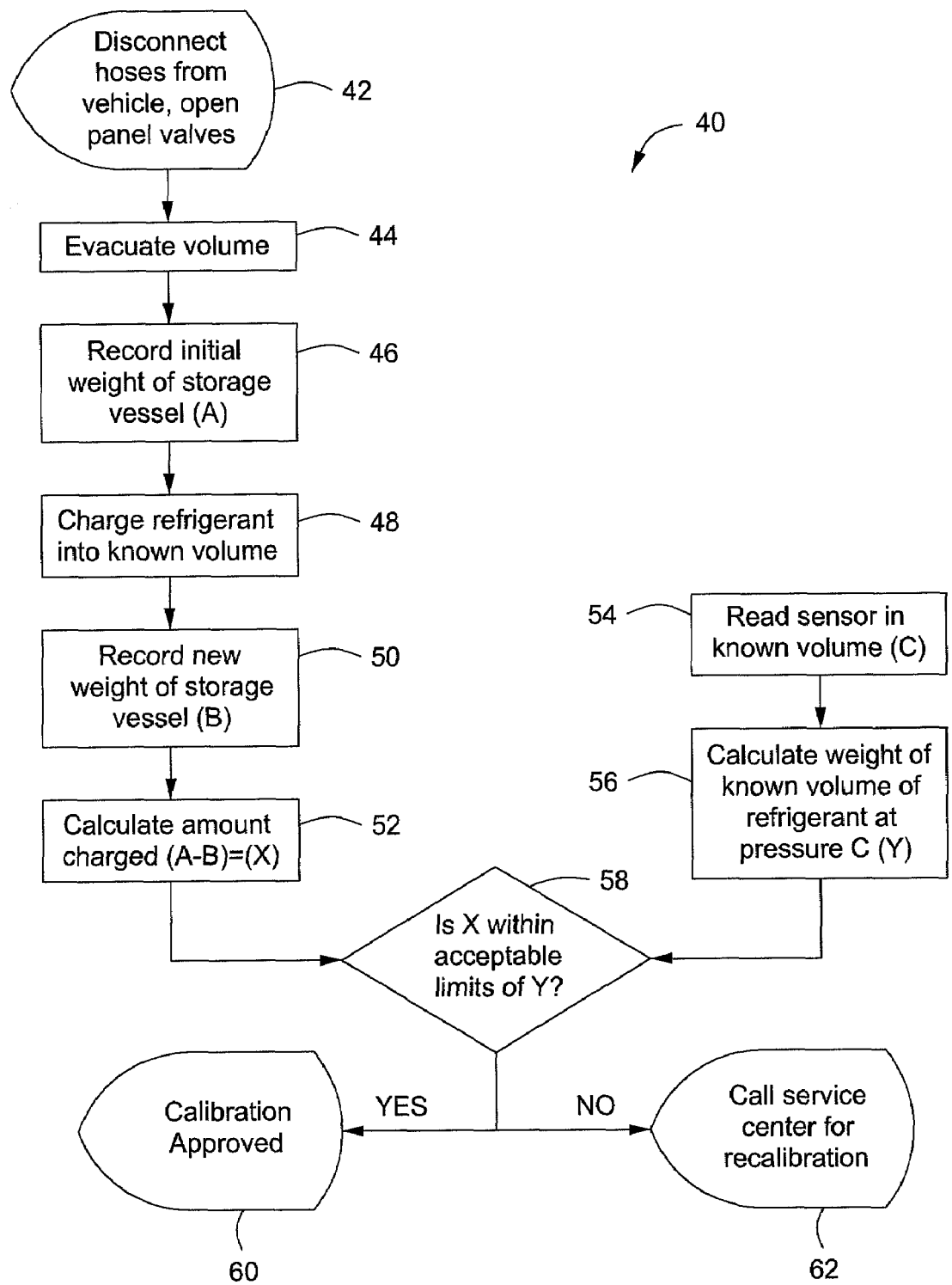
FIG. 2 is a flow chart illustrating the steps that may be followed in accordance with one embodiment of the present invention.

FIG. 2 is a flow chart of a series of steps 40 to calibrate the scale that can be done in accordance with some embodiments of the invention. The method steps 40 can be performed by a recovery, recycling, and recharging unit such as the unit sold under the ROBINAIR™ label identified as model 37488 without any additional hardware but rather by just downloading new code onto the controller of the recovery, recycling and recharging unit.

The code that can be downloaded onto the controller by known methods, such as via a USB connection or wirelessly will cause the controller 12 to send signals to various components within the handling system 10 to perform the method steps 40. The code may also have been previously loaded onto the controller. The first step 42 is to disconnect the hoses 20 from a vehicle A/C system. Of course, this step is not needed if the hoses 20 are already disconnected from the A/C system. After the hoses 20 are disconnected, the valves 22 will be closed (or in some embodiments of the invention, automatically closed) to prevent fluid from the interior 24 of the hoses 20 from being discharged into the atmosphere or ambient air. As part of step 42, the panel valves 27 can be opened to the known volume.

step 44, the interior 24 of the hoses 20 will be evacuated. The evacuation can occur by actuating the pumps 26 to pump the fluid from the known volume such as the interior 24 of the hoses 20 to the storage tank 14. In other embodiments of the invention, the known volume may be some other volume defined within the fluid handling system 10 that may or may not, include the interior 24 of the hoses 20.

Once the fluid has been returned to the storage vessel 14 in step 46, the initial weight of the storage vessel 14 is recorded. The scale 16 senses the weight of the storage vessel 14 and sends a signal indicative of the weight of the storage vessel 14 to the controller 12. The controller 12 stores the initial weight of the storage vessel 14 in a memory that is in communication with the controller.

In the next step 48, refrigerant is moved from the storage vessel 14 to the known volume. In some embodiments of the invention, the known volume is the interior 24 of the hoses 20 so that some of the refrigerant from the storage vessel 14 is sent to the interior 24 of the hoses 20. After some of the refrigerant has left the storage vessel 14, the next step 50 is to measure the new weight of the storage vessel 14. The scale 16 again weighs the storage vessel 14 and sends a signal to the controller 12 indicative of the weight of the storage vessel 14 after some of the fluid has left the storage vessel and moved to the known volume.

The next step 52, is to calculate the change in weight of the first weighing of the storage vessel 14 (step 46) and the second weighing of the storage vessel 14 (step 50), or in other words, the weight of the storage vessel 14 before some of the refrigerant has been sent to the known volume and the weight of the storage vessel 14 after some of the refrigerant had been sent to the known volume.

The initial weight can be represented by the character A, and the second weight (or the weight of the tank 14 after some of the fluid has been moved to the known volume) can be represented by the character B. In step 52, the weight B is subtracted from weight A to achieve the change in weight X.

In some embodiments of the invention, in step 54, a sensor is used to sense a particular characteristic of the known volume, such as the pressure sensed by the sensor 28 and sent to the controller 12. In other embodiments of the invention, the temperature of the fluid in the known volume is sensed by the temperature sensor 29 and is also sent to the controller 12. In other embodiments of the invention the temperature is assumed. In accordance with the invention, an assumed temperature may be a room temperature, such as, but not limited to 68°-72° F. Alternatively, a user may program a temperature for the controller to assume depending on the factors, such as where the handling system 10 is located (hot or cold places).

In step 56, in one embodiment, the weight of fluid contained within the known volume is calculated using the pressure sensed in step 54. Once the pressure is determined, the temperature is calculated using the following formula:

$$y=-1.5826243E-8\times4+1.498318E-5\times3-0.0056324\times2+1.3001087x+0.8409689, \text{ where } x=\text{pressure } (PSIG) \text{ and } y=\text{temperature } (F).$$

The calculated temperature is compared to the chart below (Table 1) in order to determine the density. Then the density is multiplied by the known volume in order to get the weight. In a second embodiment, the temperature sensed in step 54 is compared to the chart below (Table 1) and the density is multiplied by the know volume in order to get the weight.

TABLE 1

| Temp C. | R134a Density | | R134a Density | |
|---|---|---|---|---|
| | Liquid ($m^3/kg \times 10^{-3}$) | Vapor ($m^3/kg$) | Liquid ($kg/m^3$) | Vapor ($kg/m^3$) |
| −40 | 0.7055 | 0.3569 | 1417.43 | 2.802 |
| −36 | 0.7113 | 0.2974 | 1405.88 | 3.362 |
| −32 | 0.7172 | 0.2451 | 1394.31 | 4.080 |
| −28 | 0.7233 | 0.2052 | 1382.55 | 4.873 |
| −26 | 0.7265 | 0.1882 | 1376.46 | 5.313 |
| −24 | 0.7296 | 0.1728 | 1370.61 | 5.787 |
| −22 | 0.7328 | 0.1590 | 1364.63 | 6.289 |
| −20 | 0.7361 | 0.1464 | 1358.51 | 6.831 |
| −18 | 0.7395 | 0.1350 | 1352.27 | 7.407 |
| −16 | 0.7428 | 0.1247 | 1346.26 | 8.019 |
| −12 | 0.7498 | 0.1068 | 1333.69 | 9.363 |
| −8 | 0.7569 | 0.0919 | 1321.18 | 10.881 |
| −4 | 0.7644 | 0.0794 | 1308.22 | 12.594 |
| 0 | 0.7721 | 0.0689 | 1295.17 | 14.514 |
| 4 | 0.7801 | 0.0600 | 1281.89 | 16.667 |
| 8 | 0.7884 | 0.0525 | 1268.39 | 19.048 |
| 12 | 0.7971 | 0.0460 | 1254.55 | 21.739 |
| 16 | 0.8062 | 0.0405 | 1240.39 | 24.691 |
| 20 | 0.8157 | 0.0358 | 1225.94 | 27.933 |
| 24 | 0.8257 | 0.0317 | 1211.09 | 31.546 |
| 26 | 0.8309 | 0.0298 | 1203.51 | 33.557 |
| 28 | 0.8362 | 0.0281 | 1195.89 | 35.587 |
| 30 | 0.8417 | 0.0265 | 1188.07 | 37.736 |
| 32 | 0.8473 | 0.0250 | 1180.22 | 40.000 |
| 34 | 0.8530 | 0.0236 | 1172.33 | 42.373 |
| 36 | 0.8590 | 0.0223 | 1164.14 | 44.843 |
| 38 | 0.8651 | 0.0210 | 1155.94 | 47.619 |
| 40 | 0.8714 | 0.0199 | 1147.58 | 50.251 |
| 42 | 0.8780 | 0.0188 | 1138.95 | 53.191 |
| 44 | 0.8847 | 0.0177 | 1130.33 | 56.497 |
| 48 | 0.8989 | 0.0159 | 1112.47 | 62.893 |
| 52 | 0.9142 | 0.0142 | 1093.85 | 70.423 |
| 56 | 0.9308 | 0.0127 | 1074.34 | 78.740 |
| 60 | 0.9488 | 0.0114 | 1053.96 | 87.719 |
| 70 | 1.0027 | 0.0086 | 997.31 | 116.279 |
| 80 | 1.0766 | 0.0064 | 928.85 | 156.250 |
| 90 | 1.1949 | 0.0046 | 836.89 | 217.391 |
| 100 | 1.5543 | 0.0027 | 643.38 | 370.370 |

The calculated weight of fluid Y is compared with the predetermined (determined by weighing the storage tank 14 twice as described above and comparing the measured weights to determine the change in weight on the amount of fluid in the known volume) amount for fluid X in step 52. If X is within an acceptable range for fluid Y then, it is determined that calibration is not needed. In such case, in step 60 the calibration of the scale 16 is approved. A signal is sent to the display 30 indicating to the user that no calibration of the scale 16 is required. If X is not within acceptable range of Y, then the calibration of the scale 16 is rejected, and as in 62, a signal is sent to the display 30 indicating to the user that the scale needs calibration.

In some embodiments of the invention, the display 30 indicates that the service center needs to be called for recalibration of the scale 16. In some embodiments of the invention, an audio signal may also be sent to the user indicating whether the scale calibration is accepted or rejected.

In some embodiments of the invention, the display 30 may also indicate a phone number to call for recalibration of the scale 16. In other embodiments of the invention the display 30 may display instructions for calibrating the scale.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method of determining whether a scale in a fluid handling device needs to be calibrated, comprising:
    weighing a storage tank of a fluid at a first time with a scale;
    transferring the fluid from the storage tank to an area of known volume;
    weighing the storage tank at a second time with the scale, after fluid has been moved to the area of known volume;
    determining a pressure of the fluid in the area of known volume with a pressure sensor;
    calculating a temperature of the fluid in the area of known volume with the determined pressure;
    calculating the weight of fluid in the area of known volume based on the calculated temperature;
    comparing a difference in weight of the storage tank between the first and second weighing times with the weight of the fluid in the area of known volume; and
    sending a first signal to a user indicating a calibration of the scale is not needed if the difference between the compared weights of the fluid is within a predetermined range.

2. The method of claim 1, further comprising sending a second signal to a user indicating a calibration of the scale is needed if the difference between the compared weights of the fluid is not within a predetermined range.

3. The method of claim 2, wherein the first and second signals are in the form of messages displayed on a display of the fluid handling machine.

4. The method of claim 2, wherein the first and second signals are audio signals.

5. The method of claim 1, wherein the known volume is an interior portion of a hose that is configured to connect the fluid handling device with an air conditioning system of a vehicle.

6. The method of claim 5 further comprising evacuating the hose before the fluid is moved to the area of known volume.

7. The method of claim 1 further comprising:
    disconnecting hoses connecting the fluid handling device to a vehicle; and
    sealing ends of the hoses.

8. The method of claim 1, wherein calculating a temperature comprises using formula: $y=-1.5826243E-8 \times 4 + 1.498318E-5 \times 3 - 0.0056324 \times 2 + 1.3001087 \times + 0.8409689$, where x=pressure (PSIG) and y=temperature (F).

9. An article comprising a computer-readable medium which stores computer-executable instructions, the instructions causing a computer to:
    weigh a storage tank of a fluid at a first time with a scale;
    transfer the fluid from the storage tank to an area of known volume;
    weigh the storage tank at a second time with the scale, after fluid has been moved to the area of known volume;
    determine a pressure of the fluid in the area of known volume with a pressure sensor;
    calculate a temperature of the fluid in the area of known volume with the determined pressure;
    calculate the weight of fluid in the area of known volume based on the calculated temperature;
    compare a difference in weight of the storage tank between the first and second weighing times with the weight of the fluid in the area of known volume; and
    send a first signal to a user indicating a calibration of the scale is not needed if the difference between the compared weights of the fluid is within a predetermined range.

10. The computer-readable medium of claim 9 further comprises instructions to send a second signal to a user indicating a calibration of the scale is needed if the difference between the compared weights of the fluid is not within a predetermined range.

11. The computer-readable medium of claim 10, wherein the first and second signals are in the form of messages displayed on a display of a fluid handling machine.

12. The computer-readable medium of claim 9, wherein the known volume is an interior portion of a hose that is configured to connect a fluid handling device with an air conditioning system of a vehicle.

13. The computer-readable medium of claim 12 further comprises instructions to evacuate the hose before the fluid is moved to the area of known volume.

14. The computer-readable medium of claim 9 further comprises instructions to display on a display to the user to disconnect hoses connecting a fluid handling device to a vehicle and sealing ends of the hoses.

15. The computer-readable medium of claim 9, wherein calculate the weight further comprises using formula: $y=-1.5826243E-8 \times 4 + 1.498318E-5 \times 3 - 0.0056324 \times 2 + 1.3001087 \times + 0.8409689$, where x=pressure (PSIG) and y=temperature (F).

16. The computer-readable medium of claim 9, wherein the first and second signals are audio signals.

17. A fluid handling device configured to perform the steps of checking a calibration of a scale comprising:
    step for weighing a storage tank of a fluid at a first time with the scale;
    step for transferring the fluid from the storage tank to an area of known volume;
    step for weighing the storage tank at a second time with the scale, after fluid has been moved to the area of known volume;
    step for determining a pressure of the fluid in the area of known volume with a pressure sensor;
    step for calculating a temperature of the fluid in the area of known volume with the determined pressure;
    step for calculating the weight of fluid in the area of known volume based on the calculated temperature;
    step for comparing a difference in weight of the storage tank between the first and second weighing with the weight of the fluid in the area of known volume;
    step for sending a first signal to a user indicating a calibration is not needed if the difference between the compared weights of the fluid is within a predetermined range; and
    step for sending a second signal to a user indicating the calibration is needed if the difference between the compared weights of the fluid is not within a predetermined range.

18. The fluid handling device of claim 17, wherein the area of known volume is an interior portion of a hose that is configured to connect the fluid handling device with an air conditioning system of a vehicle.

19. The fluid handling device of claim 17, wherein calculating the weight further comprises using formula: $y=-1.5826243E-8 \times 4 + 1.498318E-5 \times 3 - 0.0056324 \times 2 + 1.3001087 \times + 0.8409689$, where x=pressure (PSIG) and y=temperature (F).

20. The fluid handling device of claim 17, wherein the first and second signals are audio signals.

21. A method of determining whether a scale in a fluid handling device needs to be calibrated, comprising:
    weighing a storage tank of a fluid at a first time with a scale;
    transferring the fluid from the storage tank to an area of known volume;
    weighing the storage tank at a second time with the scale, after fluid has been moved to the area of known volume;
    determining the temperature of the fluid in the area of known volume with a temperature sensor;
    calculating the weight of fluid in the area of known volume based on the determined temperature;
    comparing a difference in weight of the storage tank between the first and second weighing times with the weight of the fluid in the area of known volume; and
    sending a first signal to a user indicating a calibration of the scale is not needed if the difference between the compared weights of the fluid is within a predetermined range.

22. The method of claim 21, further comprising sending a second signal to a user indicating a calibration of the scale is needed if the difference between the compared weights of the fluid is not within a predetermined range.

23. The method of claim 21, wherein the known volume is an interior portion of a hose that is configured to connect the fluid handling device with an air conditioning system of a vehicle.

24. The method of claim 21, wherein calculating the weight is based on the determined temperature and a known density of the fluid at that determined temperature.

25. The method of claim 21 further comprising:
    disconnecting hoses connecting the fluid handling device to a vehicle; and
    sealing ends of the hoses.

* * * * *